April 30, 1935.    L. Z. LA FOREST    1,999,570
PHONOGRAPHIC RECORD RESURFACING MACHINE
Filed Jan. 26, 1934    2 Sheets-Sheet 1
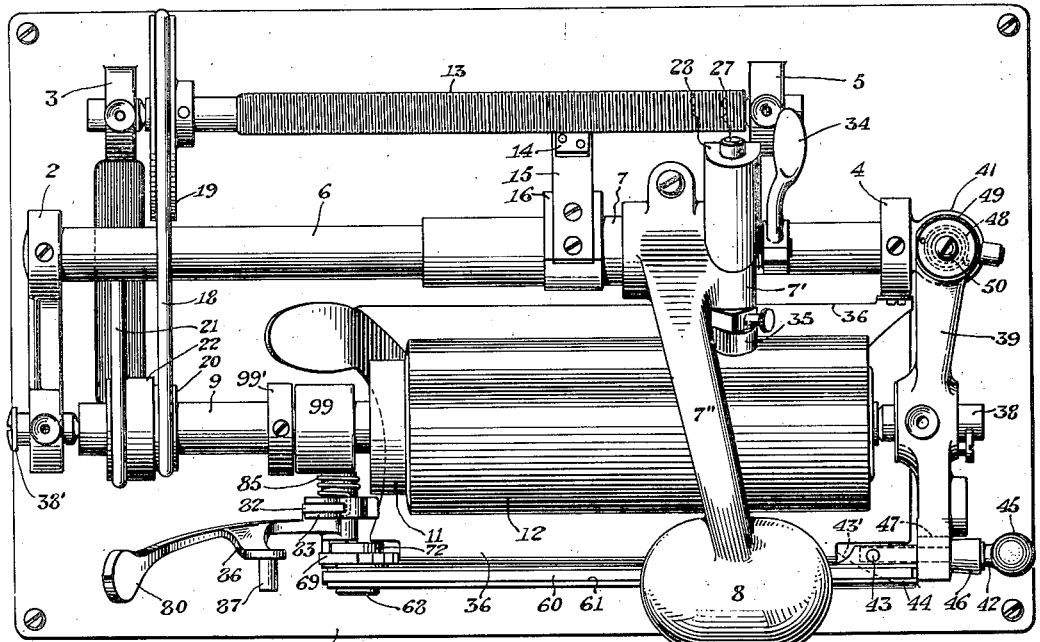
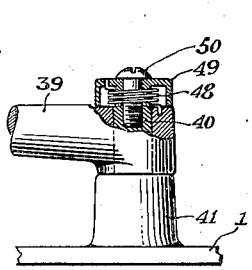
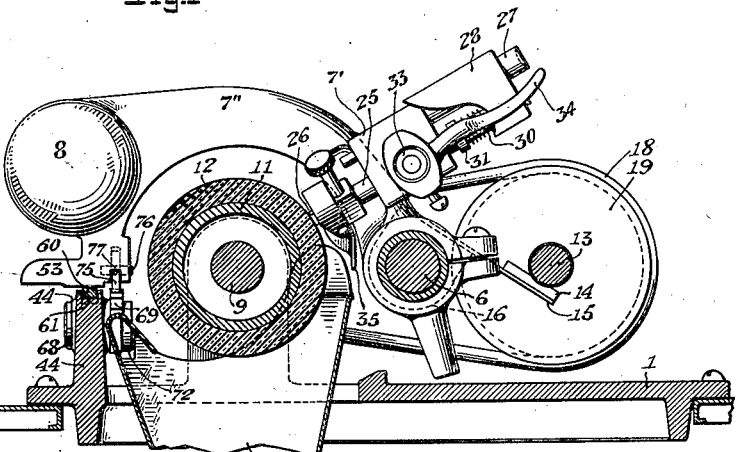
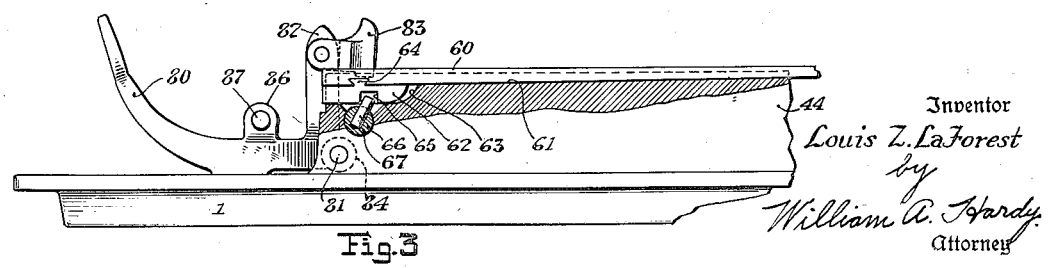
Inventor
Louis Z. LaForest
by
William A. Hardy
Attorney

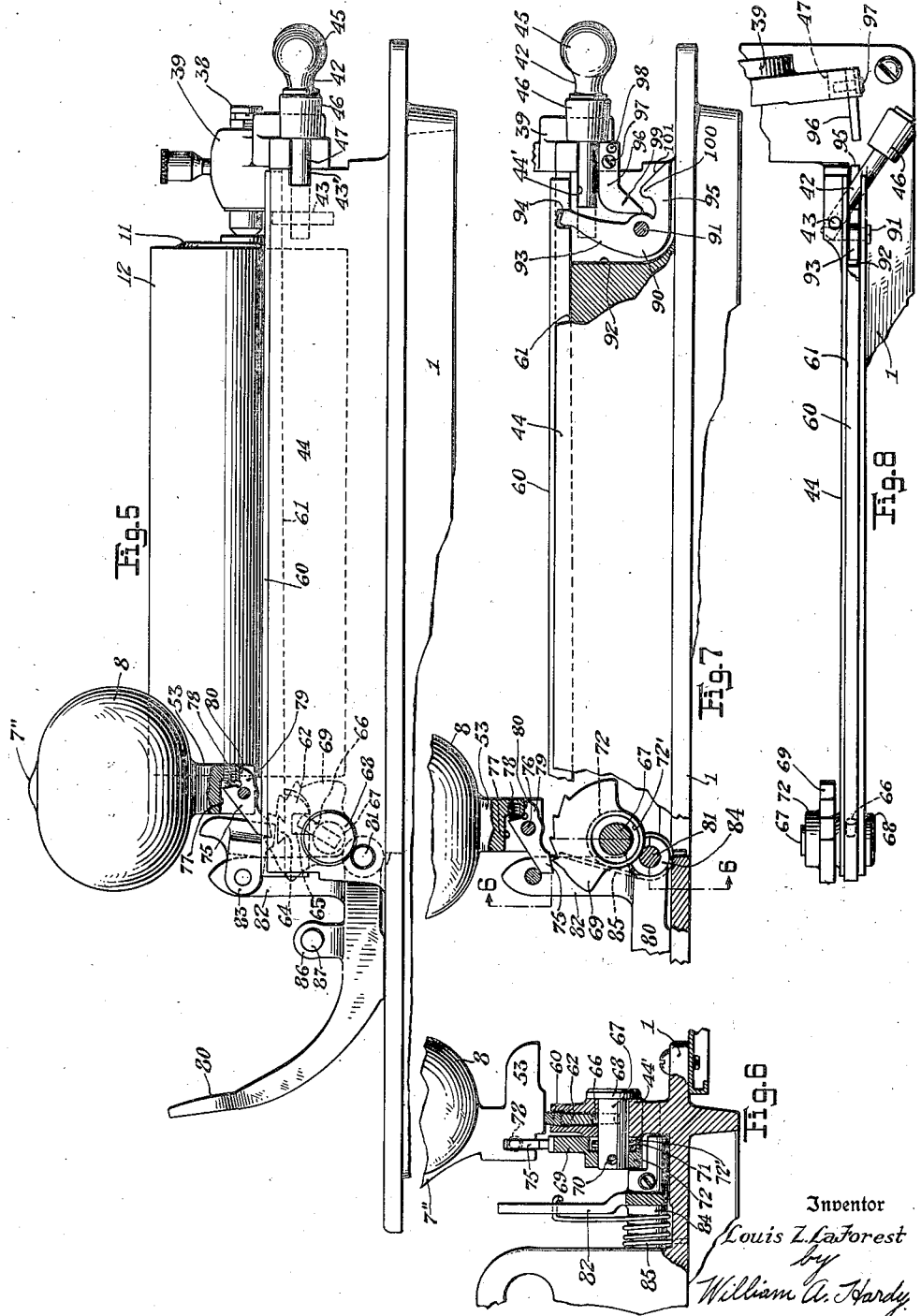

Patented Apr. 30, 1935

1,999,570

UNITED STATES PATENT OFFICE 1,999,570

PHONOGRAPHIC RECORD RESURFACING MACHINE

Louis Z. La Forest, East Orange, N. J., assignor to Thomas A. Edison, Incorporated, West Orange, N. J., a corporation of New Jersey Application January 26, 1934, Serial No. 708,381

10 Claims. (Cl. 82—1.1)

This invention relates to phonographic record resurfacing machines, and more particularly to improved means and methods for governing the operation of the resurfacing device proper in such machines.

The term "record" is used herein as denoting a wax or other tablet having a surface which when used bears an impression of sound, and which when virgin is adapted to receive such an impression. The function of the resurfacing machine is the restoration of the record surface from a used to a virgin condition. In such machines as commonly employed the record is rotated and its surface meanwhile subjected to the action of a suitable tool, which removes material from the record surface to a level in the record largely determined, and with a uniformity and general excellence of result largely determined, by the adjustment of the resurfacing tool.

It is a broad object of this invention to provide, in connection with machines of the class described, improved means and methods for regulating the adjustment of the resurfacing tool.

For best resurfacing it is frequently necessary and always desirable to subject the record to two or more successive operations of the type above outlined, the level in the record to which material is removed by the successive operations being progressively advanced. It is an object of my invention to provide means for automatically advancing the level to which material will be removed by each of several successive operations of the machine on a given record.

In the normal case advancement of the adjustment of the resurfacing tool in the direction of the record advances the level to which material will be removed. Accordingly it is a more specific object of my invention to provide means for automatically advancing the adjustment of the resurfacing tool with respect to the record between successive operations of the machine on a given record.

Another object of the invention is the provision of automatic means for returning the resurfacing tool to an original adjustment between operations of the machine on distinct records.

Other and allied objects will more fully appear from the following description and the appended claims.

In the description reference is had to the accompanying drawings, of which:

Figure 1 is a plan view of a record resurfacing machine to which my invention has been applied;

Fig. 2 is a cross sectional view taken substantially through the mid portion of the machine from the right, with the tool carriage moved to its left-most position;

Fig. 3 is a fragmentary front elevation illustrating a portion of my invention in a normal condition of adjustment;

Fig. 4 is a fragmentary view illustrating the pivoting of the swinging gate 39 which appears in Fig. 1;

Fig. 5 is a more complete front elevation illustrating more comprehensively an embodiment of my invention;

Fig. 6 is a cross sectional view taken along the line 6—6 of Fig. 7;

Fig. 7 is a fragmentary front elevation illustrating an embodiment of my invention modified in certain respects from that of preceding figures; and Fig. 8 is a fragmentary plan view analogous to Fig. 7.

The resurfacing tool most commonly employed in record resurfacing machines is a knife blade, the action of which is to cut or shave material from the surface of the record. The form of a record frequently subjected to resurfacing operations—e. g., the record for a business phonograph or dictating machine—is that of a cylinder. Accordingly in the accompanying drawings the resurfacing tool is illustrated as a knife blade, and the machine as one adapted for the resurfacing of cylindrical records. It will be understood, however, that this is illustrative only, and that the broader aspects of my invention are not limited to the knife form of resurfacing tool or to the cylindrical form of record.

In connection with the general description of the resurfacing machine with which I have illustrated my invention, reference is invited to Figs. 1, 2 and 3 of the drawings. The machine may comprise a base 1 provided with left-hand standards 2 and 3, right-hand standards 4 and 5, central standard 99, rail 44 and the boss 41, to which latter is pivoted the gate 39. The gate is hereinafter more particularly referred to, but it is here mentioned to occupy a closed position as illustrated in Fig. 1.

A mandrel 11 adapted to bear a cylindrical record 12 and to retain the same by frictional engagement may be seen in Fig. 1 to be disposed transversely of the machine; this mandrel is secured to the mandrel shaft 9. The shaft 9 passes through a slightly oversize hole in central standard 99 and, when the gate 39 is closed, is journalled to conically pointed studs 38 and 38', respectively in the gate 39 and the left-hand standard 2. When the gate is opened to permit removal of one record and insertion of another, and the stud 38 thus disassociated from the shaft 9, the latter is retained, in approximate position only, by the impingement of the thereto secured collar 99' against the central standard 99. Shaft 9, and hence any record borne by the mandrel 11, is adapted to be rotated by belt 21 passing over pulley 22 secured to the shaft. The belt 21 is driven from a motor or other suitable power source which may be disposed below base 1 but which it is not here necessary to show.

The resurfacing tool, or knife blade, is illustrated in Fig. 2 at 26; it may for example be formed of sapphire or other hard stone. It is mounted to the extremity of knife bar 25, which in turn is assembled to the tool carriage 7 through a system hereinafter described. The carriage 7 is slidably supported on the carriage rod 6, which in turn is secured to standards 2 and 4. The carriage 7 is provided with the forward extension 7" including combined weight and hand-piece 8 and the shoe 53, which latter normally rests on the front rail 44 or member thereto assembled. As long as the shoe 53 so rests, rotation of the mandrel 11 is intended to be accompanied by a steady movement, for example in a left-hand direction, of the carriage 7 along the rod 6 and hence of the knife blade 26 along the surface of the record in a direction parallel to the record axis. This motion is then produced by the engagement of a feed nut 14, secured through the medium of extension 15 to the carriage portion 16, with a feed screw 13. This screw is journalled to standards 3 and 5, and is rotated throughout mandrel rotation by belt 18 passing over pulley 19 secured to the screw and over pulley 20 secured to the mandrel shaft 9. The feed nut 14 may be disengaged from the screw 13 and the knife blade 26 from the surface of the record, and the carriage 7 then manually moved at will along the rod 6, upon raising of the hand-piece 8 and shoe 53, whereby the whole carriage assembly is moved about rod 6 in a clockwise direction as illustrated in Fig. 2.

The assembly of the knife bar 25 to the carriage 7 may be effected in manner well known in the art and specifically set forth in United States Patent 1,721,913, issued July 23, 1929 to C. W. Luhr. The knife bar 25 is slidably mounted in a housing portion 7' of the extension 7". Also slidably mounted in the housing 7' is a guide rod 27 to which is secured a tie-bar or yoke 28. Upon movement of the guide rod 27 and yoke 28 toward the mandrel 11 the yoke urges the knife bar 25 toward the mandrel by virtue of compression spring 30 interposed between the yoke and a collar 31 secured to the knife bar. When the mandrel is first rotated after placement thereon of a record to be resurfaced, the guide rod 27 and yoke 28 are advanced toward the record until the resulting compression of spring 30 produces the desired adjustment of the knife bar 25 and the thereby carried knife blade 26 with respect to the record surface. Thereupon the knife bar is rigidly clamped in the housing 7' by means of the clamp nut 33 operated by the handle 34. Close to the record and carried by the forward end of the knife bar 25 is a chip deflector 35, and below the record and the path of travel of the chip deflector is a chip chute 36 for conducting away material removed by the knife blade 26 from the record surface.

The gate 39 is maintained in a closed position by means of a latch or bolt 42, provided with knob 45. This latch is pivoted to a vertical pin 43 to swing in a horizontal slot 43' formed in the front rail 44. Its most counter-clockwise contemplated position is that illustrated in Fig. 1, wherein it passes within a horizontal slot 47 formed in the front end of gate 39. A collar 46 resiliently carried on the latch 42 may then impinge against the outer surface of the gate 39, maintaining the gate in the position which has been described as closed—i. e., against the front rail 44. When it is desired to open the gate the latch 42 is moved forwardly, or clockwise, about its pivot 43 to disengage the gate 39, whereupon the gate may be swung, or preferably automatically swings, in a counterclockwise direction about its pivot. The pivoting of the gate 39 to the boss 41 is through the medium of a pivot stud or post 48 rigidly secured to the boss and best seen in the detail Fig. 4. The gate may be urged to counterclockwise rotation, and thus caused automatically to open when disengaged by the latch 42, by the torsion spring 48 terminally secured to the gate and to a member which is made rigid with respect to the post 48. This member is the inverted cup 49, which may be rotatively adjusted to provide the desired torsional force in spring 48 and then clamped to the post by means of the screw 50.

While the resurfacing machine shown in Figs. 1 and 2 is one in which there has been incorporated my invention, the detailed description of the latter is aided by reference to Fig. 3 et seq. as well as to the earlier figures. According to my invention, after the resurfacing tool has traversed the record surface, say in a leftwardly direction, it is automatically advanced in the direction of the record—i. e., toward the axis of the record of cylindrical form—by a determinate amount. Therefore upon manual restoration of the carriage to the right-hand extremity of its path of travel, the tool is properly adjusted for the removal of material from the record, as then existing, to a predetermined depth. In the illustrated embodiments of my invention this tool advancement is produced by a determinate lowering of the member on which rests the shoe 53 of carriage 7. This produces about the rod 6 a slight lowering, or counterclockwise adjustment as illustrated in Fig. 2, of the whole forward portion of the carriage assembly and hence of the knife blade 26. The knife blade being located above a plane joining the axes of the record and of rod 6, this adjustment of the knife blade will contain a component in the direction of the record axis.

I provide, as a member on which the shoe 53 may rest, a straight-edged, slightly wedge-shaped slide member 60. This is adapted to slide in a dove-tail groove 61 made in the top of front rail 44. The wedge shape of the slide member 60 is such as to result in a slightly greater vertical thickness at the left-hand extremity; and the bottom of groove 61 is suitably sloped to maintain the top of slide member 60 accurately horizontal. Movement of the slide member in a leftward direction will thus be understood to lower the top surface of that member, and I may therefore effect the desired determinate lowerings of the top of the slide member between tool-record traversals by determinate movements of that member in such direction. Such a movement may be produced automatically by the motion of the shoe 53 along either extreme portion of the slide member 60; I have utilized the left-hand, or terminal, extreme portion.

The longitudinal position of slide member 60 may be determined by the rotary position of a ratchet gear segment 69 suitably coupled thereto.

This gear segment is seen for example in full elevation in Fig. 7 and in cross section in Fig. 6. It is located behind the front rail 44 near the left-hand extremity of the latter. Its hub 72 may be pinned as at 70 to a stud 67 journalled through the front rail 44. In a recess 72' in its hub may be provided a compression spring 71, which may urge the head 68 of the stud against the boss 44' in the front rail 44 and thus provide sufficient friction to prevent random rotation of the gear segment 69. In the stud 67 is provided a pin 66, best seen in Figs. 3 and 5. This engages a recess in a downward extension 62 secured to slide member 60, providing the requisite coupling to that member of the gear segment 69. The extension 62 may fit slidably in a recess 63 formed in the front rail 44, which will align it with slide member 60 as to forward or rearward movement; the dovetail joint 64 may conveniently secure it to slide member 60 as to sideward or vertical movement.

The gear segment 69, as illustrated for example in Fig. 5, may be assumed in its most clockwise position, and the slide member 60 therefore in its most rightward adjustment. This is contemplated as obtaining throughout the first leftwardly traversal of the record surface by the knife blade 26. Immediately after this traversal has been completed, however, and before the leftward motion of the carriage 7 has been halted, the gear segment 69 is intended to be rotated counter-clockwise to the extent of the angle subtended by one of its teeth, and the slide member thereby moved correspondingly to the left and the shoe 53 appropriately lowered. That this may be effected automatically there is provided at the rear of the carriage shoe 53 a ratchet pawl 75 adapted just before the completion of leftward carriage motion to engage the topmost tooth of the gear segment 69 and to move the latter to the angular extent mentioned. The pawl 75 may be pivoted as at 76 to operate in a slot 77 in the shoe 53, and may be biased to gear-engaging position by a compression spring 78 which urges the pawl tail 79 against the slot shoulder 80. Because of the ratchet form of the teeth of gear segment 69 and of the pawl 75 no danger exists of clockwise rotation of the gear segment during the manual return of the carriage to the right-hand extremity of its travel path, even though the operator of the machine fails to raise the carriage appreciably during such return. Therefore, at each successive carriage return up to the number of the teeth on gear segment 69, and provided the carriage motion during the preceding record traversal has not been prematurely halted, the resurfacing tool will be advanced to cut the record surface as then existing to a determinate depth.

Although I contemplate no particular limitation of this depth, I prefer to make it slight, having found the best resurfacing to be effected under these conditions. It may for example, be made .001" in the case of a typical cylindrical wax or composition record. In a machine having the approximate proportions illustrated in the accompanying drawings such a depth of cut corresponds very approximately to an .003" lowering of the top of slide member 60. Assuming that the angular rotation of the gear segment 69 to the extent of the angle subtended by one tooth will produce .1" motion of the slide member 60, I may obtain the mentioned .003" lowering of the top of the slide member by making the pitch of its wedge shape and of the bottom of groove 61 each .030" per linear inch.

In order that the automatic tool advancement may be available for the resurfacing of any given record up to as many successive record traversals by the tool as there are teeth in gear segment 69, it is necessary that the gear segment be returned to its original—e. g., most clockwise—position between operations by the machine on distinct records. While the operator of the machine may, of course, effect this return manually, it is obviously desirable that it be accomplished automatically, as an incident to the change of record. Accordingly my invention includes two distinct embodiments of means for automatically effecting this return. The first is illustrated in the earlier figures, specifically 1, 3 and 5, while the second is illustrated in Figs. 7 and 8.

In connection with the first embodiment, attention is invited to the well known ejecting arm 80, which appears in the drawings as having a hub 84 pivoted as at 81 and as provided with the upward extension 82, to the upper extremity of which is pivoted the ejecting member 83. When the ejecting arm is rocked rightwardly about its pivot the ejecting member 83 impinges upon the left-hand extremity of a record 12 then borne by the mandrel and pushes the record rightwardly off the mandrel (the gate 39 being appropriately open). The torsion spring 85 encircling the hub 84 and terminally secured to the arm extension 82 and to the base 1 biases the arm 80 to the normal position illustrated. The first embodiment of the gear-returning means returns the gear upon operation of the ejecting arm 80, it being contemplated that this arm will be operated to remove each record upon the completion of its resurfacing. Accordingly an upward extension 86 is provided from an intermediate portion of the arm 80, and to this extension is secured a horizontal pin 87. This pin is at the same distance from the ejecting arm pivot 81 as is the left-hand end of the slide member 60; and is arranged to impinge against such end upon operation of the ejecting arm, whereby to move the slide member 60 and hence the gear segment 69 to their original positions.

It is of course possible to remove a record 12 from the mandrel without the use of the ejecting arm 80, and the second embodiment of the gear-returning means contemplated by my invention is associated with a portion of the machine whose manipulation is positively required between operations on distinct records. This portion is the gate 39. To the front end surface of the gate 39 is secured a finger 96, as by means of a screw 97 and a locating pin 98. The finger is provided with a cam portion 99. In a vertical slot 92 in the right-hand extremity of front guide rail 44 is pivoted, as at 91, a double or L-shaped arm member 90. The essentially vertical arm 93 of the member 90 extends upwardly into a notch 94 formed in the bottom of slide member 60. On the essentially horizontal and rightwardly extending arm 95 of the member 90 is formed a contact portion 100. When the slide member 60 occupies any but its most rightward position, the contact portion 100 lies in the path traversed by the cam portion 99 upon opening of the gate 39. When the gate is opened under these conditions the cam portion 99 forces the contact portion 100 to move downwardly, the member 90 to rotate clockwise, the slide member 60 to move rightwardly, and the gear segment 69 to rotate to its most clockwise position. It is, therefore, impossible to open the gate for the removal of a record without returning the gear segment 69 to its original position.

There finally remains the possibility that before the closing of the gate after insertion of another record for resurfacing the positions of the various members established as just outlined may be disturbed. In order that the closing of the gate may positively re-establish them I may provide at the extremity of the arm 95 a cam surface 101 merging into the contact portion 100 and arranged so that the motion of the cam portion 99 attendant upon closing of the gate will enforce the same adjustments as it was above outlined to force upon opening of the gate.

While I have disclosed my invention in terms of specific embodiments thereof, it will be understood that I intend no limitation of scope by virtue of specific details of these embodiments, but rather intend to define my invention by the following claims:

I claim:

1. In combination in a phonographic record resurfacing machine, a record moving device, a movable carriage, a supporting track therefor, a record resurfacing tool associated with said carriage, and means for producing unidirectional movement of said tool transverse to the course of record surface motion and within predetermined limits, said tool being returnable at will from the terminal limit to the initial limit of its said movement, and means responsive to said tool movement adjacent said terminal limit thereof for producing a determinate advancement of said tool in direction toward a record moved by said device, said means comprising a member associated with said track and movable longitudinally thereof.

2. In combination in a phonographic record resurfacing machine, a record moving device; a track transverse to the course of record surface motion; a record resurfacing tool; a tool support; means for producing unidirectional movement of said support along said track within limits, said support being returnable at will from the terminal limit to the initial limit of its said movement; and means responsive to said support movement along a predetermined portion of said track for producing a determinate displacement of said track, whereby said tool is advanced by a determinate amount in direction toward a record moved by said device.

3. In combination in a phonographic record resurfacing machine, a carriage and means for producing unidirectional movement thereof in a limited path, said carriage being returnable at will from the terminal extremity to the initial extremity of said path; means for retaining a record in predetermined relationship to said path and means operable at will to release such record from such relationship; means for moving a record so retained, to move the record surface in a course transverse to said path; a track parallel to said path; a record resurfacing tool; a tool support, said support being connected with said carriage for movement therewith and being slidable along said track; means responsive to unidirectional movement of said supporting means along a predetermined portion of said track for producing a determinate displacement of said track, whereby said tool is advanced by a determinate amount in direction toward a record retained as aforesaid; and means responsive to operation of said releasing means for producing an opposite displacement of said track, whereby upon each operation of said releasing means said track is restored to a given position.

4. In a phonographic record resurfacing machine, a track provided with a longitudinally extending inclined groove and including a wedge-shaped slide member retained within said groove and slidable longitudinally thereof; a record resurfacing tool; a tool support slidable along said slide member; and mutually engageable means, respectively carried by said tool support and connected with said slide member, for producing a determinate longitudinal displacement of said slide member in response to movement of said tool support along a predetermined portion of said slide member.

5. In a phonographic record resurfacing machine, a track provided with a longitudinally extending inclined groove and including a wedge-shaped slide member retained within said groove and slidable longitudinally thereof; a record resurfacing tool; a tool support slidable along said slide member; mutually engageable means, respectively carried by said tool support and connected with said slide member, for producing a determinate longitudinal displacement of said slide member in response to movement of said tool support in a given direction along a predetermined portion of said slide member; means for retaining a record in position to be resurfaced by said tool; means operable at will to release such record from such position; and means responsive to the operation of said releasing means for producing an opposite longitudinal displacement of said slide member to a given position.

6. In a phonographic record resurfacing machine, a track provided with a longitudinally extending inclined groove and including a wedge-shaped slide member retained within said groove and slidable longitudinally thereof; a record resurfacing tool; a tool support slidable along said slide member; a ratchet gear connected with said slide member and adapted upon rotation to displace said slide member longitudinally; and a ratchet pawl carried by said tool support and adapted to engage and rotatively to displace said gear by a determinate amount upon movement of said tool support in a given direction along a predetermined portion of said slide member.

7. In a phonographic record resurfacing machine, a track provided with a longitudinally extending inclined groove and including a wedge-shaped slide member retained within said groove and slidable longitudinally thereof; a record resurfacing tool; a tool support slidable along said slide member; means for retaining a record in position to be resurfaced by said tool; means operable at will to release such record from such position; a ratchet gear connected with said slide member and adapted upon rotation to displace said slide member longitudinally; a ratchet pawl carried by said tool support and adapted to engage and rotatively to displace said gear by a determinate amount upon movement of said tool support in a given direction along a predetermined portion of said slide member; and means responsive to the operation of said releasing means for oppositely displacing said gear to a given angular position.

8. In a phonographic record resurfacing machine, a track provided with a longitudinally extending inclined groove and including a wedge-shaped slide member retained within said groove and slidable longitudinally therof; a record resurfacing tool; a tool support slidable along said slide member; a mandrel adapted to bear a record to be resurfaced; an ejecting device operable at will to eject from said mandrel a record borne thereby; mutually engageable means, respectively carried by said tool support and connected with said slide member, for producing a determinate longitudinal displacement of said slide member in response to movement of said tool support along a predetermined portion of said slide member; and means connected with, and responsive to operation of, said ejecting device for producing an opposite longtiudinal displacement of said slide member to a given position.

9. In a phonographic record resurfacing machine, a track provided with a longitudinally extending inclined groove and including a wedge-shaped slide member retained within said groove and slidable longitudinally theerof; a record resurfacing tool; a tool support slidable along said slide member; a mandrel adapted to bear a record to be resurfaced; a gate closable to support said mandrel in predetermined position; mutually engageable means, respectively carried by said tool support and connected with said slide member, for producing a determinate longitudinal displacement of said slide member in response to movement of said tool support in a given direction along a predetermined portion of said slide member; and means connected with, and responsive to the opening of, said gate for producing an opposite longitudinal displacement of said slide member to a given position.

10. In a phonographic record resurfacing machine, a track provided with a longitudinally extending inclined groove and including a wedge-shaped slide member retained within said groove and slidable longitudinally thereof; a record resurfacing tool; a tool support slidable along said slide member; a mandrel adapted to bear a record to be resurfaced; a gate closable to support said mandrel in predetermined position; mutually engageable means, respectively carried by said tool support and connected with said slide member, for producing a determinate longitudinal displacement of said slide member in response to movement of said tool support in a given direction along a predetermined portion of said slide member; and means connected with, and responsive to both opening and closing of said gate, for moving said slide member to a given longitudinal position.

LOUIS Z. LA FOREST.